United States Patent [19]
Kayama et al.

[11] Patent Number: 5,963,523
[45] Date of Patent: *Oct. 5, 1999

[54] OPTICAL RECORDING MEDIUM DISCRIMINATING APPARATUS USING LASER BEAMS OF DIFFERENT WAVELENGTHS

[75] Inventors: Hiroshi Kayama, Itami; Ryoichi Imanaka; Tetsuo Saimi, both of Hirakata, all of Japan

[73] Assignee: Matsushita Electric Industrial Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,276

[22] Filed: Feb. 13, 1997

[30] Foreign Application Priority Data

Feb. 14, 1996 [JP] Japan ........................................ 8-26407

[51] Int. Cl.$^6$ ............................................. G11B 3/90
[52] U.S. Cl. ................................................ 369/58
[58] Field of Search ............................. 369/58, 54, 112, 369/116, 44.37, 14

[56] References Cited

U.S. PATENT DOCUMENTS

| | | | |
|---|---|---|---|
| 5,172,354 | 12/1992 | Otsubo | 369/58 |
| 5,479,387 | 12/1995 | Ando et al. | 369/58 |
| 5,502,702 | 3/1996 | Nakajo | 369/58 |
| 5,684,771 | 11/1997 | Furukawa et al. | 369/58 |
| 5,684,773 | 11/1997 | Hayashi | 369/58 |

*Primary Examiner*—Tan Dinh
*Attorney, Agent, or Firm*—Wenderoth, Lind & Ponack, L.L.P.

[57] ABSTRACT

In an optical recording and reproducing apparatus, two light sources such as a laser diode of different wavelengths from each other are provided, and photosensors receive the light emitted by the light sources and reflected by the optical recording medium. Before recording or reproduction is started, the type of optical recording medium having a different wavelength dependent reflectance is discriminated. Because two wavelengths are used, the difference of the outputs is large, and the type of the optical recording medium is discriminated reliably according to the outputs of the photosensors. Then, the operation of the apparatus is stabilized according to the type of the optical recording medium by optimizing the laser power, the gain of the controller, the revolution number of the medium or the like.

17 Claims, 9 Drawing Sheets

OPTICAL RECORDING MEDIUM DISCRIMINATING APPARATUS USING LASER BEAMS OF DIFFERENT WAVELENGTHS

FIELD OF THE INVENTION

The present invention relates to an optical reproducing apparatus, a recording and reproducing apparatus, and an apparatus for processing information including the processing of information from the optical reproducing apparatus or the optical recording and reproducing apparatus of the present invention.

DESCRIPTION OF PRIOR ART

A variety of optical recording media is currently being used. A compact disk is a medium used only for data reproduction. A compact disk recordable (CD-R) is one of optical recording media to which data can be recorded. A CD-R is one of many compact disc standards and it is a CD compatible medium. After information is recorded, it can be reproduced by a conventional compact disk player. In addition, a CVD-ROM, CVD-RAM and the like are also used as an optical recording medium, and a disk using phase transformation (PTR) is available. Beside the optical disks mentioned above, an magneto-optical disk is also used.

However, a CD-R has a larger wavelength dependent reflectance than a conventional compact disk. Then, if the laser mounted in an optical head emits a light beam of shorter wavelengths, the reflectance is decreased, and a CD-R cannot be reproduced in the same conditions as a conventional compact disk (CD). For example, the reflectance at 780 nm of wavelength is 90% for a CD and 70% for a CD-R, while the reflectance at a shorter wavelength of 650 nm is 90% for a CD and 10% for a CD-R. Because a CD-R has a high absorptance of light at 650 nm, if a CD-R is reproduced in the same conditions as a CD, recorded data may be destroyed. Even if the recorded data in a CD-R are not destroyed, the data cannot be reproduced because the reflectance is low.

SUMMARY OF THE INVENTION

An object of the present invention is to provide an optical recording and reproducing apparatus which recognizes a type of optical recording media having different reflectances and records.

Another object of the present invention is to provide an optical recording and reproducing apparatus which records and reproduces data stably according to the type of optical recording medium.

In optical recording and reproducing apparatus according to the invention, the type of an optical recording medium is discriminated before recording or reproduction by using the wavelength dependent reflectance of the optical recording media. Then, two light sources for different wavelengths (for example, a wavelength equal to or longer than 720 nm and another wavelength less than 720 nm) are used. In one embodiment, the light sources comprise light emitting diodes which emit different lights. Two photosensors are provided for receiving the light beam emitted by the light sources and reflected by the optical recording medium. A discriminator receives output signals of the photosensors at different times when the two light sources emit light beams successively. The two print heads may be integrated as a single print head including the two laser diodes and the two photosensors.

In a modified embodiment, two print heads are provided, and a laser diode mounted in an optical head is used as the light source, and a photosensor mounted in the optical head is used as the photosensor. For example, the wavelength of a first laser diode is 660±60 nm and that of a second laser diode is 780±60 nm. Then, the optical heads provided to record and reproduce data can also be used to discriminate the type of optical recording medium.

In a modified embodiment a single photosensor is used instead of the two photosensors. In this case, the discriminator detects the output signal of the photosensor at different times when the two light sources emit light beams successively.

When each of the first and second photosensors comprise at least two photo-sensing areas, the discriminator uses a focus error signal or a focus sum signal as the difference between the output signals of the first and second photosensors to be detected.

Preferably, the discriminator comprises a memory device for storing the output of the photosensor for the shorter wavelength and receives the output for the shorter wavelength before receiving the output for the longer wavelength.

Further, a controller optimizes the recording or reproducing conditions according to the type of optical recording medium determined by the discriminator. Further, the controller stops recording or reproducing of the apparatus or ejects the optical recording medium when the recording or reproduction is made impossible by changed conditions.

An advantage of the present invention is that the type of optical information medium can be discriminated before recording or reproduction by using a simple device which utilizes the wavelength dependent reflectance at two wavelengths.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
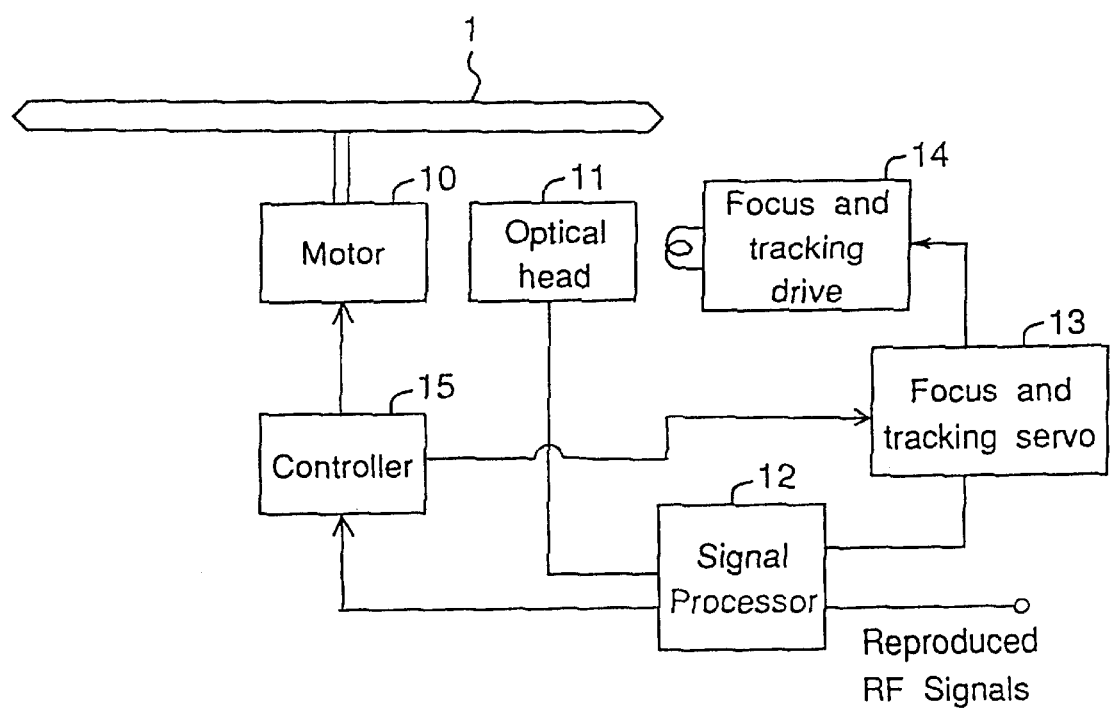
FIG. 1 is a block diagram of an optical recording and reproducing apparatus.

Referring now to the drawings, wherein like reference characters designate like or corresponding parts throughout the several views, FIG. 1 shows a main part of an optical recording and reproducing apparatus according to a first embodiment of the invention. The structure shown schematically in FIG. 1 is known, and it is common to the embodiments explained below. An optical recording medium 1 is, for example, a compact disk (CD) used only for reproduction, a compact disk recordable (CD-R) to which data can be recorded. Before the recording or reproducing is started, the type of the optical recording medium is determined. In the embodiments explained below, the types of a compact disk (CD) and a compact disk recordable (CD-R) are determined.

In an optical recording or reproducing apparatus, an optical information medium 1 is contained, for example, in a tray and rotated by a motor 10. An optical head 11 emits a laser beam to the optical recording medium 1 and detects the laser beam reflected by the medium 1. The signal detected by the optical head 11 is received by a signal processor 12, which sends reproduced RF signals. On the other hand, the reproduced signal is also sent to a focus tracking servo 13 which moves the optical head 1. A tracking and focus drive 14 performs tracking and focusing of the optical head 11 according to the signal received from the focus tracking servo 13. A controller 15, which includes a central processing unit, controls the motor 10, the signal processor 12 and the focusing and tracking servo and drive 13, 14.

Figure 2:
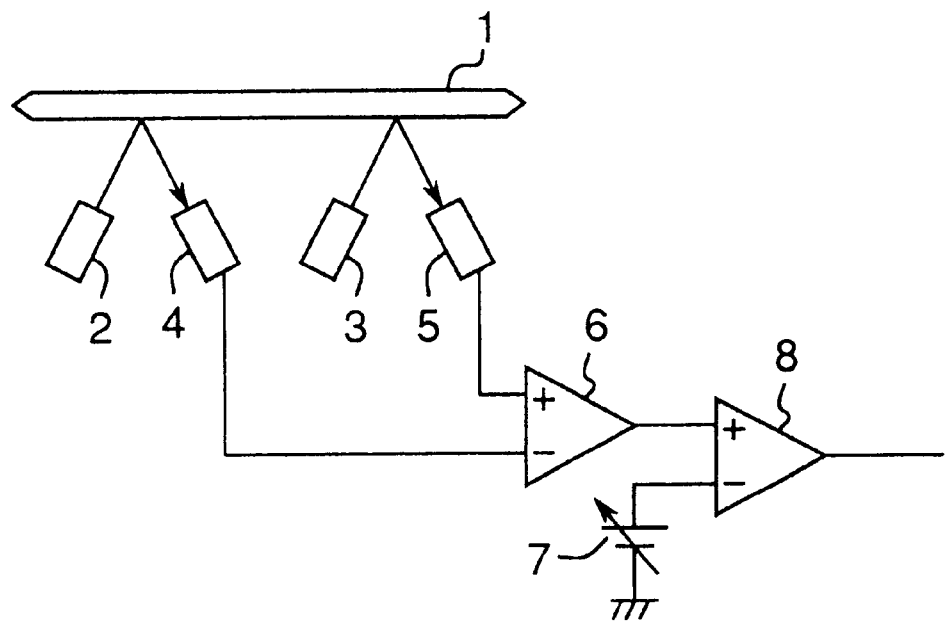
FIG. 2 is a block diagram of an optical recording and reproducing apparatus according to a first embodiment of the invention.

FIG. 2 shows a part of the optical recording and reproducing apparatus shown in FIG. 1 relating to the determination of the type of optical recording medium. The parts shown in FIG. 1 are not shown in FIG. 2 for the ease of explanation. Two light sources 2 and 3 emit lights having different wavelengths from each other, and they are arranged at a predetermined distance from the optical recording medium 1. The light sources 2 and 3 are selected among light emitting diodes for emitting lights of red, yellow, green and infrared. For example, the light source 2 is a light emitting diode of infrared, while the other light source 3 is a light emitting diode of red. The wavelength of the light emitted by the first light source 2 is shorter than the light emitted by the second light source 3. Photosensors 4 and 5 receive the lights emitted by the light sources 2 and 3 and reflected by the medium 1. For example, the components 2–5 are mounted to a tray for containing the optical recording medium 1. Preferably, the light sources 2 and 3 and the photosensors 4 and 5 are positioned so that the photosensors 4 and 5 output the largest signals. A differential amplifier 6 comprising an operational amplifier detects a difference between the outputs of the photosensors 4 and 5, and a comparator 8 compares the output of the differential amplifier 6 with a voltage supplied by a variable voltage source 7.

The output of the comparator 8 is sent to the controller 15 (FIG. 1). Before recording or reproducing data, a type of the optical recording medium 1 having a different wavelength dependent reflectance is recognized according to the output of the comparator 8. The optical system and the output power of the light sources 2 and 3 are set so as not to destroy the recording side of the optical recording medium 1 according to the type of the medium 1. It is to be noted that the variable voltage 7 can be set within a wider range of voltage and, accordingly, a margin for detection is larger in contrast to an apparatus having one light source because two light sources 2 and 3 of different wavelengths are provided to recognize the optical information medium. The above-mentioned structure for determining the type of the medium can be fabricated in simple manner and at a low cost.

If the apparatus shown in FIG. 2 is compared with the embodiments described below which perform discrimination by using two light sources and one photosensor, the circuit structure is simpler because a switch or the like is not needed and no holding circuit is used to hold an output of the photosensor when the light sources are emitted at different times. Further, because the two light sources are emitted at the same time and the outputs of the photosensors are compared directly, the discrimination speed is high.

Further, if the light sources and the photosensors are set in the tray for containing an optical recording medium, the type of the optical recording medium can be determined quickly when it is put in the tray. Therefore, if the apparatus shown in FIG. 2 is compared with embodiments described below which use optical heads, the discrimination speed is high because it is not necessary to wait until a state where the recording or reproducing becomes possible (tray loading, disk chucking and start of rotation of the disk motor in a conventional optical disk drive).

Figure 3:
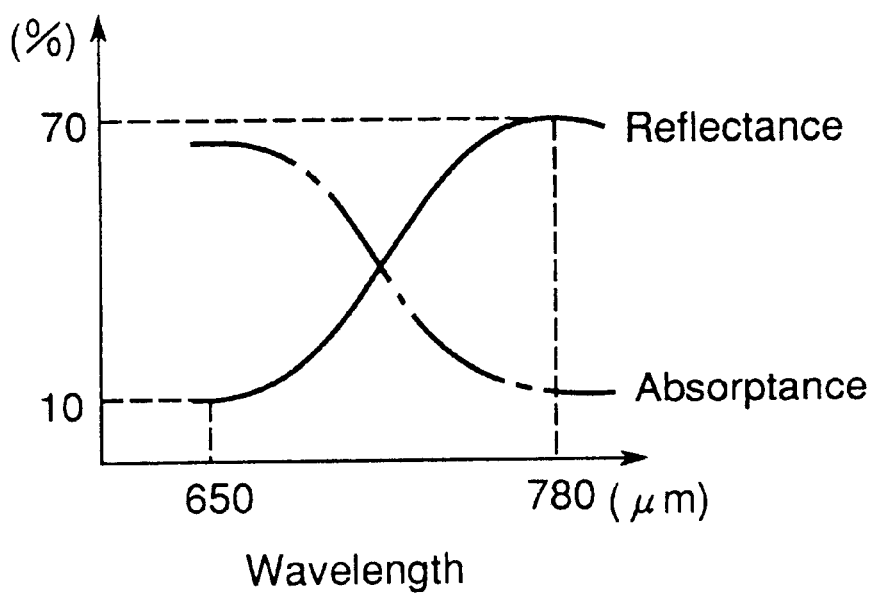
FIG. 3 is a graph of the reflectance and absorptance of an example of a CD-R.

The discrimination of a type of information recording medium is explained with examples of a compact disk (CD) and a compact disk recordable (CD-R). A CD-R cannot be discriminated from a CD on the basis of the size. However, a CD-R has a recording side made from an organic material, and the reflectance has a large wavelength dependency. For example, the reflectance is about 70% at 780 nm and about 10% at 650 nm. The reflectance at 650 nm is about 35% even for a CD-R having a smaller wavelength dependent reflectance. FIG. 3 shows an example of reflectance and absorptance of a CD-R. On the other hand, a CD has a recording side made from aluminum, and the wavelength dependence of reflectance is small. The reflectance thereof is about 90% at wavelengths of 780 and 680 nm. Then, if the wavelength of the light source 2 is 650 nm and that of the other light source 3 is 780 nm, the output of the photosensor 5 does not change between a CD and a CD-R, while that of the other photosensor 4 for a CD-R is about ½ to ⅒ times that for a CD. Thus, a large difference is observed. Then, the type of optical information medium, CD or CD-R, can be determined with a bi-level output signal of the comparator 8 by detecting the difference of the outputs of the photosensors 4 and 5 by the differential amplifier 6 and by comparing the output of the differential amplifier 6 with a reference value generated by the variable voltage source 7 using the comparator 8. In the apparatus shown in FIGS. 1 and 2, in order to discriminate the type of an optical recording medium, CD or CD-R, the variable voltage source 7 is set at a midpoint between the voltages when a CD and a CD-R are set. Then, when a CD is set in the apparatus, the output voltage of the comparator 8 is positive, while when a CD-R is set, it is negative.

In the first embodiment explained above, the lights emitted by the two light sources 2 and 3 have different wavelengths from each other. On the other hand, a light source may emit a white light instead of the light sources 2 and 3, and optical filters of different characteristics may be provided at the light-receiving faces of the two photosensors 4 and 5. Similar advantages to the above-mentioned embodiment can also be obtained in this modified embodiment.

Figure 4:
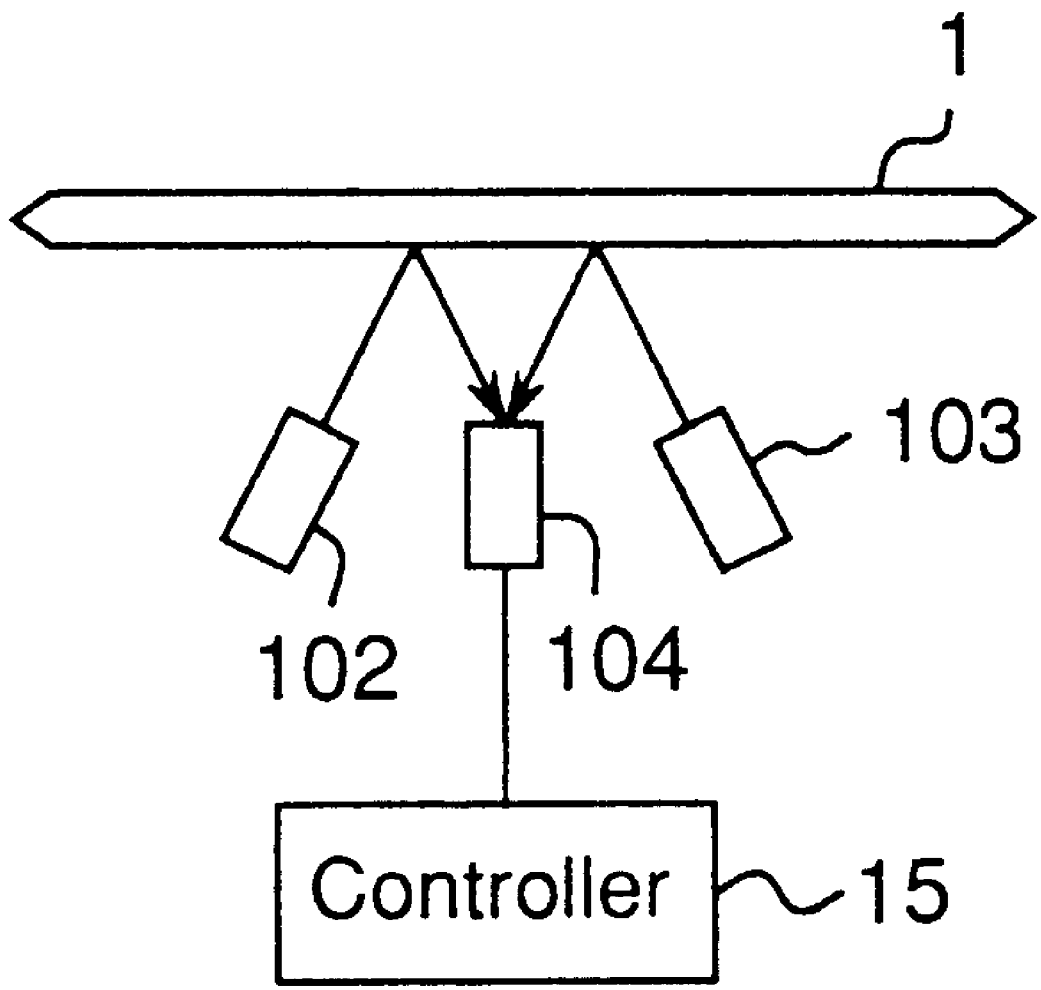
FIG. 4 is a block diagram of an optical recording and reproducing apparatus according to a second embodiment of the invention.

FIG. 4 shows an optical recording and reproducing apparatus according to a second embodiment of the invention. In this apparatus, a single photosensor 104 is used. Two light sources 102 and 103 for emitting lights of different wavelengths from each other are arranged at a predetermined distance from an optical recording medium 1. The photosensor 104 receives light emitted by the light sources 102 and 103 and reflected by the medium 1 in synchronization of the light emission of the light source 102, 103. When the light source 102 is turned on, the other light source 103 is turned off, and the photosensor 104 receives the light beam emitted by the first light source 102 and reflected by the medium 1. When the light source 103 is turned on, the other light source 102 is turned off, and the photosensor 104 receives the light beam emitted by the second light source 103 and reflected by the medium 1. Preferably, the photosensor 104 has a small wavelength dependency at wavelengths of the lights emitted by the light sources 102 and 103. The output of the photosensor 104 is sent to the controller 15 to determine the type of the optical recording medium.

Figure 5:
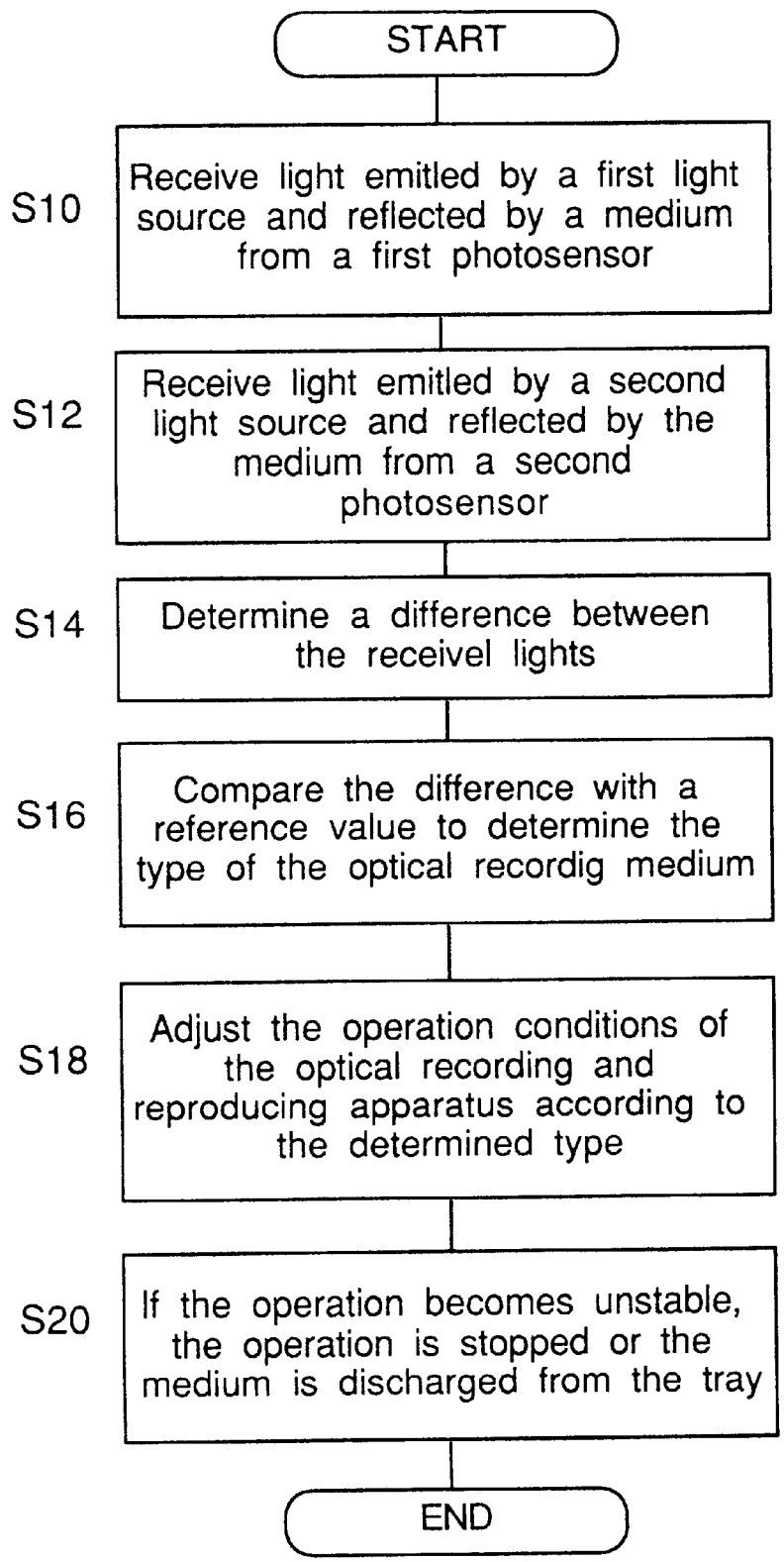
FIG. 5 is a flowchart of the processing of a controller of the optical recording and reproducing apparatus.

FIG. 5 shows a flow of the discrimination of the type of the optical recording medium of the controller 15. First, the first light source 102 is driven to emit the light beam, and the output of the photosensor 104 for the light of the shorter wavelength is received to be stored (step S10). Because the output for the shorter wavelength is received first, if the output is found anomalous, the operation may be stopped at once. Next, the second light source 103 is driven to emit the light beam, and the output of the photosensor 104 for the light of the longer wavelength is received (step S12). Then, a difference of the two outputs is calculated (step S14), and the type of the optical recording medium is determined by comparing the difference with a reference value (step S16). The above-mentioned processing on the discrimination of the type of the optical recording medium can also be applied to other embodiments. After the type of the optical recording medium is determined, if necessary, the apparatus is controlled to stabilize the recording and reproduction for an optical recording medium having a wavelength dependency (step S18). For example, the output power of the laser in the optical head 11, the gain of the output of the photosensor in the optical head, or the revolution number of the medium is optimized according to the type of the optical recording medium. If recording and reproduction are impossible, the operation is stopped or the medium is discharged in order to prevent destruction of the recording side of the medium 1 (step S20). This processing of the controller 15 on the control after the determination is common in the embodiments of the invention and will be explained later.

In a different way, a switch is provided to supply the output of the photosensor 104 in synchronization to the light emission of the light sources 102 and 103, and a differential amplifier as shown in FIG. 2 detects a difference between the two outputs of the photosensor. A peak-hold circuit or the like is provided at the input stage of the differential amplifier. Then, a comparator compares the output of the differential amplifier with a reference voltage.

Figure 6:
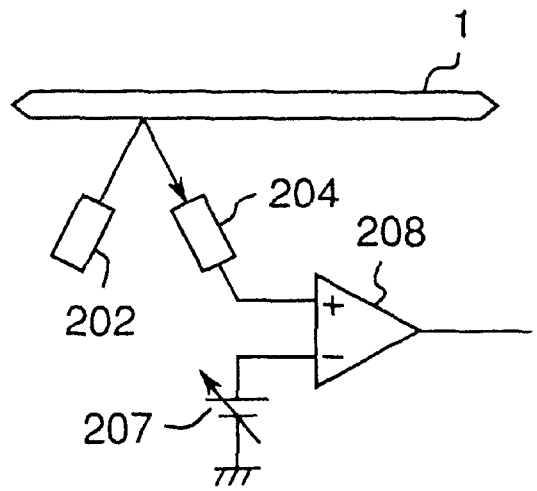
FIG. 6 is a block diagram of an optical recording and reproducing apparatus according to a third embodiment of the invention.

FIG. 6 shows an optical recording and reproducing apparatus according to a third embodiment of the invention. In this apparatus, a single light source 202 and a single photosensor 204 are used. The light source 202 is arranged at a predetermined distance from an optical recording medium 1, and the photosensor 204 receives a light emitted by the light source 202 and reflected by the medium 1. A comparator 208 compares the output of the photosensor 204 with a variable voltage 207. The light source 202 emits a light of a wavelength at which the reflectance is different largely in the optical information media 1 to be discriminated.

Figure 7:
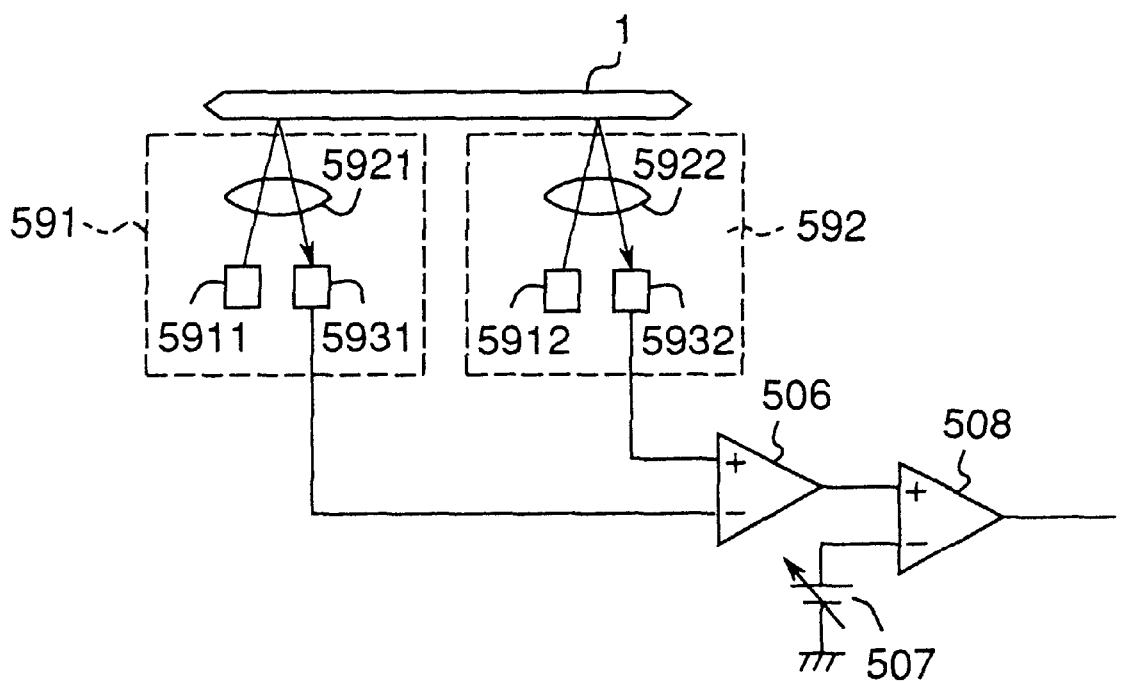
FIG. 7 is a block diagram of an optical recording and reproducing apparatus according to a fourth embodiment of the invention.

FIG. 7 shows an optical recording and reproducing apparatus according to a fourth embodiment of the invention. In this apparatus, two optical heads 591 and 592 are used instead of the light sources 2, 3 and the photosensors 4 and 5 shown in FIG. 1. The optical heads 591 and 592 correspond to the optical head 11 shown in FIG. 1 used for recording and reproduction in this embodiment. The first optical head 591 comprises a first laser diode 5911 as the light source, a first object lens 5921 and a first photosensor 5931. The second optical head 592 comprises a second laser diode 5912 as the light source, a second object lens 5922 and a second photosensor 5932. The first photosensor 5931 receives light emitted by the first laser diode 5911, propagating through the first object lens 5921, reflected by the medium 1, and propagating again through the first object lens 5921. The second photosensor 5932 receives a light emitted by the second laser diode 5912, propagating through the second object lens 5922, reflected by the medium 1, and propagating again through the second object lens 5922. A differential amplifier 506 amplifies a difference between the outputs of the photosensors 5931 and 5932, and a comparator 508 compares the output of the differential amplifier 506 with a reference voltage generated by a variable voltage source 507. Thus, before recording or reproducing data, a type of the optical recording medium 1 having a different wavelength dependency of reflectance is discriminated according to the output of the comparator 8. In this embodiment, the output power of the laser diodes 5911 and 5912 are set sufficiently weak if the recording side of the optical recording medium 1 is liable to be destroyed.

Because two optical heads 591 and 592 are used, recording and reproducing can be reliably performed for two or more types of optical information media having the above-mentioned wavelength dependency. Further, because the type of optical information medium can be detected by using the light sources and the photosensors mounted in the optical heads, no additional elements are needed to detect the type of optical information medium, in contrast to the above-mentioned embodiments. When a CD is compared with a CD-R, the first laser diode 5911 of wavelength of 650 nm and the second laser diode 5912 of wavelength of 780 nm are used. The reflectances at 650 nm and at 780 nm are substantially the same for a CD, while they are largely different for a CD-R. Then, a CD-R can be discriminated easily from a CD. Further, because the two optical heads are used, the reference voltage can be set within a wide range of voltage, and a margin for the discrimination is large. The wavelengths of the two laser diodes are not restricted to the above-mentioned value. When laser diodes of shorter wavelengths are developed, the wavelengths of the two laser diodes may be decreased.

Figure 8:
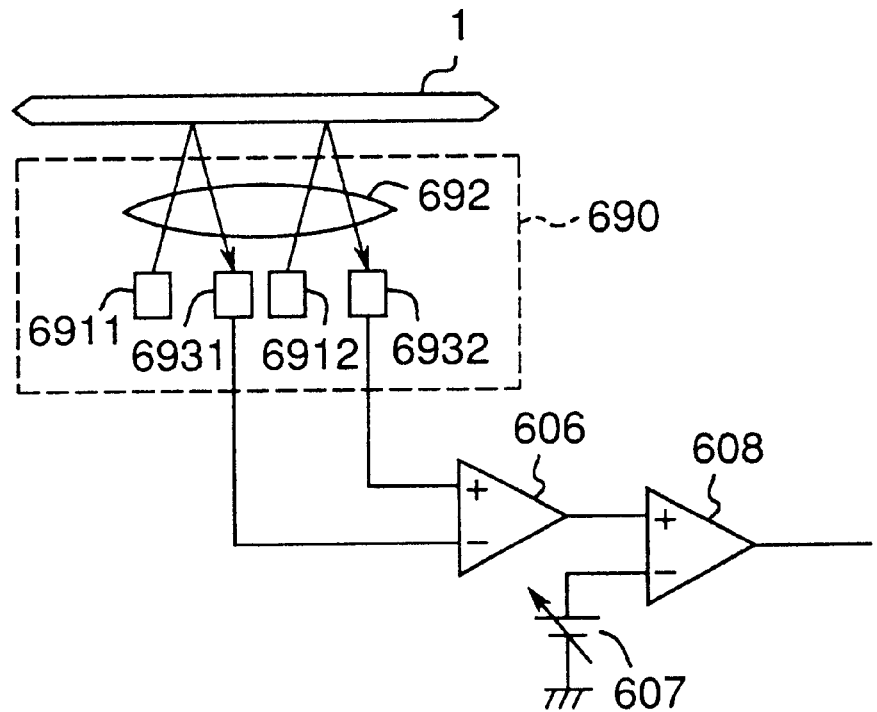
FIG. 8 is a block diagram of an optical recording and reproducing apparatus according to a fifth embodiment of the invention.

FIG. 8 shows an optical recording and reproducing apparatus according to a fifth. embodiment of the invention. In this apparatus, a single optical head 690 is used. The optical head 690 corresponds to the optical head 11 shown in FIG. 1 used for recording and reproduction in this embodiment. The optical head 690 comprises a first laser diode 6911, a second laser diode 6912, a common object lens 692, a first photosensor 6931 and a second photosensor 6932. The first photosensor 6931 receives light emitted by the first laser diode 6911, propagating through the object lens 692, reflected by the medium 1, and propagating again through the object lens 692. The second photosensor 6912 receives light emitted by the second laser diode 6912, propagating through the same object lens 692, reflected by the medium 1, and propagating again through the object lens 692. A differential amplifier 606 amplifies a difference between the outputs of the photosensors 6931 and 6932, and a comparator 608 compares the output of the differential amplifier 606 with a reference voltage generated by a variable voltage source 607 similar to the counterparts 506 and 508 of the apparatus of the fourth embodiment shown in FIG. 7.

Figure 9:
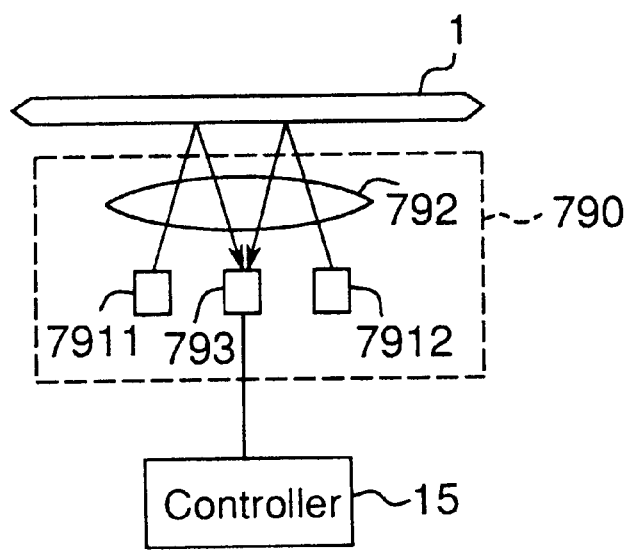
FIG. 9 is a block diagram of an optical recording and reproducing apparatus according to a sixth embodiment of the invention.

FIG. 9 shows an optical recording and reproducing apparatus according to a sixth embodiment of the invention. In this apparatus, a common photosensor 793 is used, and an optical head 790 has a compact size. The optical head 790 comprises a first laser diode 7911, a second laser diode 7912, a common object lens 792, the common photosensor 793. The optical head 790 corresponds to the optical head 11 shown in FIG. 1 used for recording and reproduction in this embodiment. The photosensor 793 receives light emitted by the laser diode 7911 or 7912 and reflected by the medium 1 in synchronization of the light emission of the light source 7911, 7912. When the first laser diode 7911 is turned on, the second one 7912 is turned off and the photosensor 793 receives the light beam emitted by the first laser diode 7011, propagating through the object lens 792, reflected by the medium 1 and propagating again through the object lens 792. When the second laser diode 7912 is turned on, the first one 7912 is turned off and the photosensor 793 receives the light beam emitted by the second laser diode 7912, propagating through the object lens 792, reflected by the medium 1 and propagating again through the object lens 792. Preferably, the photosensor 793 has a small wavelength dependency at wavelengths of the lights emitted by the laser diodes 7911 and 7912. The output of the photosensor 793 is sent to the controller 15 to determine the type of the optical recording medium. The processing of the controller 15 is the same as explained in the second embodiment.

Figure 10:
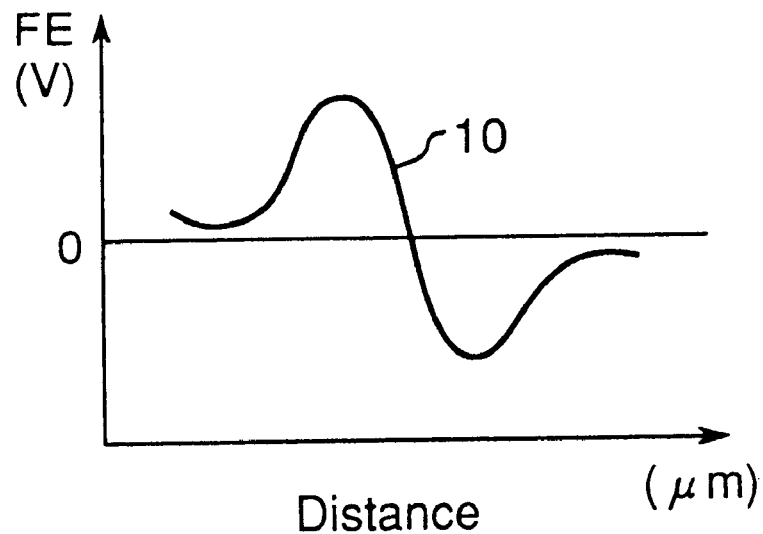
FIG. 10 is a graph of an S-like waveform of a focus error signal (FE) plotted against the distance between an optical head and an optical recording medium.

In the apparatuses of the fourth and fifth embodiments shown in FIGS. 7 and 8, each of the first and second photosensors 5931, 5932, 6931, 6932 preferably comprises at least two photo-sensing areas. Then, a difference (focus error signal) of the output signals of two of the photo-sensing areas of a photosensor is derived by subtraction. FIG. 10 shows an example of a waveform 10 of focus error signal (FE) plotted against a distance between the optical head and the medium when focusing is performed. Then, a difference between the focus error signals of the two photosensors is amplified by the differential amplifier.

Figure 11:
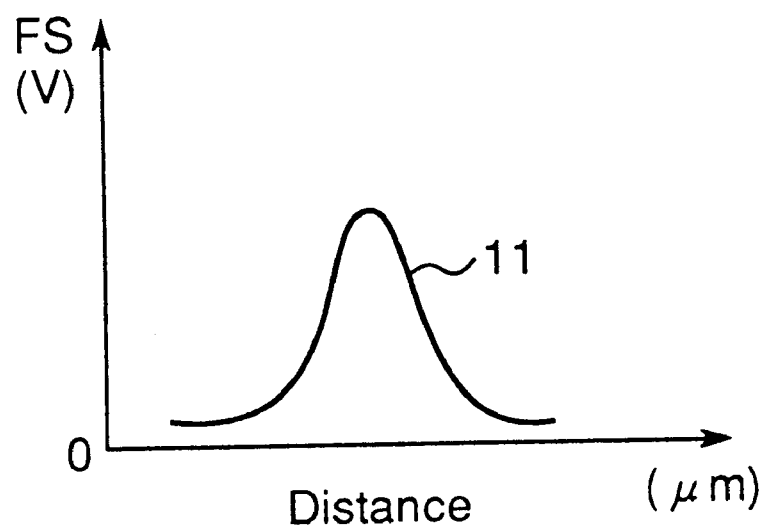
FIG. 11 is a graph of a waveform of focus sum signal (FS) plotted against the distance between an optical head and an optical recording medium.

In the apparatuses of the fourth to sixth embodiments shown in FIGS. 7 to 9, each of the photosensors 5931, 5932, 6931, 6932 and 793 preferably comprises at least two photo-sensing regions. Then, a sum (focus sum signal) of the output signals of two of the photo-sensing areas is derived by summation. FIG. 11 shows an example of a waveform of the focus sum signal 11 plotted against a distance between the optical head and the medium when focusing is performed. In order to discriminate the type of optical information medium, the comparator 508, 608 compares the peak level of the waveform 11 with the reference voltage. This discrimination is advantageous because the type of the optical recording medium can be determined even for an optical recording medium for which focusing cannot be performed due to surface damages or the like.

In the apparatuses shown in FIG. 7 or the like having two light sources, focusing is performed by emitting the laser beam by the two light sources at the same time. Then, the type of the optical recording medium can be determined precisely in a short time.

Further, in the apparatus shown in FIG. 8, the precision of discrimination can be enhanced by using the photosensors 6931 and 6932 having wavelength dependence of the reflectance at the relevant laser wavelengths or by providing optical filters before the photosensors 6931 and 6932.

Figure 12:
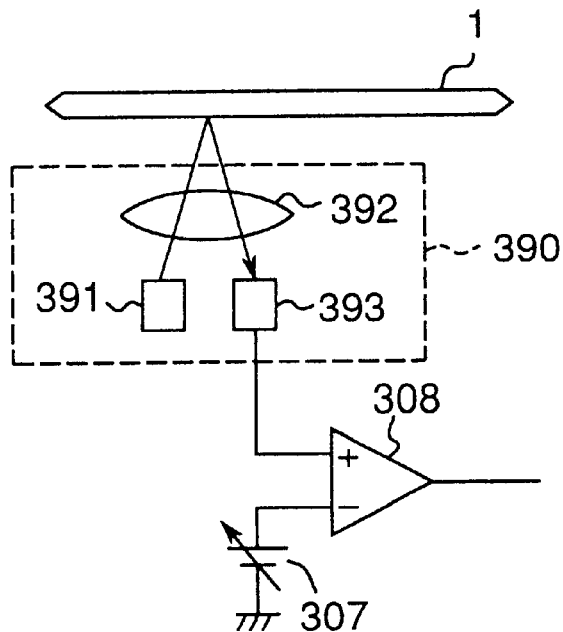
FIG. 12 is an optical recording and reproducing apparatus according to a seventh embodiment of the invention.

FIG. 12 shows an optical recording and reproducing apparatus according to a seventh embodiment of the invention. In this apparatus, a single optical head 390 comprises a light source 391, an object lens 392 and a photosensor 393, and it corresponds to the optical head 11 shown in FIG. 1 used for recording and reproduction in this embodiment. The photosensor 393 receives light emitted by the light source 391, propagating through the object lens 392, reflected by the medium 1 and propagating again through the object lens 392. A comparator 308 compares the output of the photosensor 393 with a reference voltage generated by a variable voltage source 307. The light source 391 emits light of a wavelength, for example 650 nm, at which the reflectance is largely different in the optical information media 1 to be discriminated. The optical head 390 used necessarily in an optical recording and reproducing apparatus is also used for discriminating the types of optical recording medium. Therefore, no new elements are needed for discriminating the type of optical recording medium.

Figure 13:
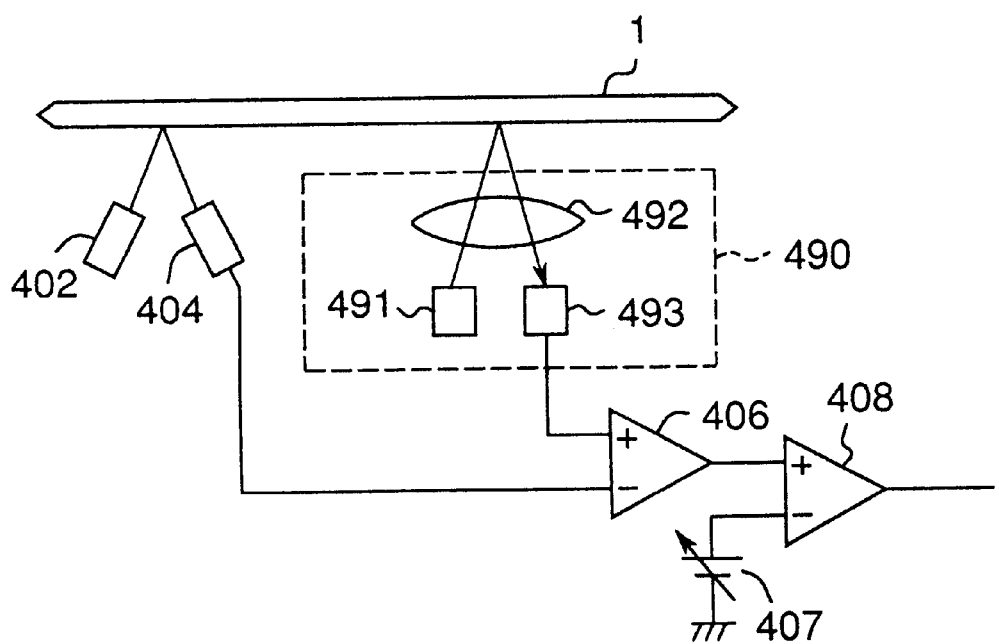
FIG. 13 is an optical recording and reproducing apparatus according to an eighth embodiment of the invention.

FIG. 13 shows an optical recording and reproducing apparatus according to an eighth embodiment of the invention. In this apparatus, different types of light sources are used. A light source 402 emits light which is received by a photosensor 404. On the other hand, the optical head 490 comprises a light source of a laser diode 491, an object lens 492 and a photosensor 493. The photosensor 493 receives light emitted by the light diode 491, propagating through the object lens 492, reflected by the medium 1 and propagating again through the object lens 492. A differential amplifier 406 amplifies a difference between the outputs of the photosensors 404 and 493. The output levels of the two photosensors 404 and 493 are adjusted appropriately before being supplied to the differential amplifier 406. A comparator 408 compares the output of the differential amplifier 406 with a reference voltage generated by a variable voltage source 407. The optical head 490 corresponds to the optical head 11 shown in FIG. 1 used necessarily in an optical recording and reproducing apparatus. The same optical head is also used for discriminating the types of optical recording medium. Then, the number of elements used for discriminating the type of optical recording medium is decreased, and the type of the optical recording medium can be determined even for an optical recording medium for which focusing cannot be performed due to surface damages or the like. Further, because two light sources are used, the variable voltage source 7 can be set within a wide range of voltage, and a margin for the discrimination is large, as in the previous embodiments.

Figure 14:
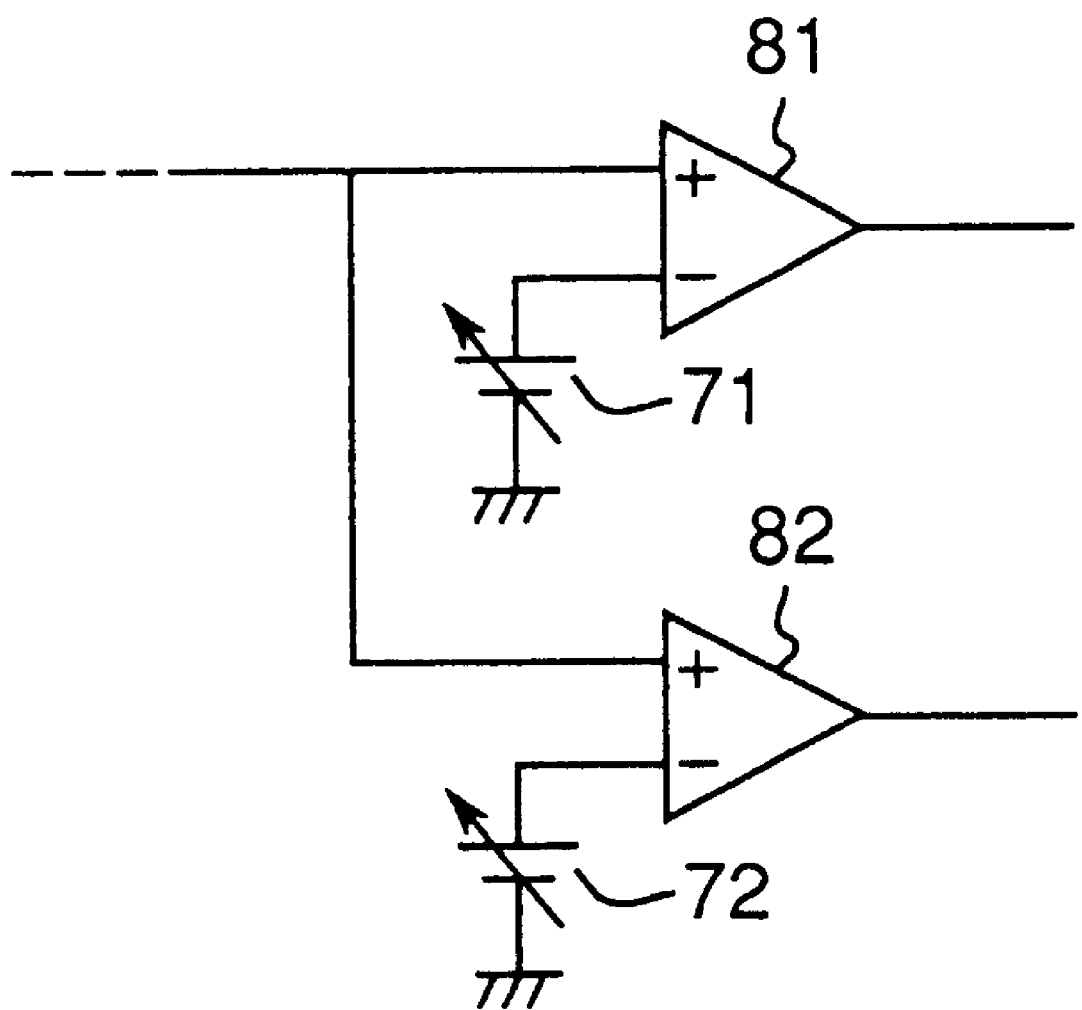
FIG. 14 is a diagram depicting the connection of a plurality of comparators when three or more types of optical recording media are discriminated.

In the above-mentioned embodiments, a CD-R and a CD are discriminated. However, three or more types of optical recording media can be discriminated if they have different reflectances at particular wavelengths. For example, if three types of optical recording media have differences of reflectance at two wavelengths distributed sufficiently, they can be discriminated by using two comparators 81 and 82 provided in parallel to each other, as shown in FIG. 14. The comparators 81 and 82 compare the output of the differential amplifier with variable voltages 71 and 72 which are different from each other. If the output voltages of the differential amplifier are V1, V2 and V3 in the order of the magnitude of the output voltage for the three types of optical recording media 1, the variable voltage 71 is set at a voltage between V1 and V2, and the other variable voltage 72 is set at a voltage between V2 and V3. If the number of the types of optical recording media is more than three, the number of the comparators and the variable voltages is increased. Three or more types of optical recording media can also be discriminated if they have different reflectances at a particular single wavelength.

After the type of optical recording media is discriminated, the operation of the optical recording and reproducing apparatus records or reproduces data to and from the optical recording medium in appropriate conditions according to the type of the medium. The recording and reproducing operation is changed according to the reflectance of the optical recording medium. The upper limit of the laser power of the optical head is optimized according to the type of optical recording medium. The quantity of light received by the photosensor emitted by the laser diode and reflected by the medium is increased generally during recording and during reproducing when the laser power is increased. However, if the laser power becomes too high, the recording side of the medium is destroyed. Then, the upper limit of the laser power of the optical head is optimized so as to receive a suitable signal at the photosensor.

Further, the gain of the output of the photosensor is optimized. The magnitude of the signal received by the photosensor depends on the type of optical recording medium. Then, the gain of the signal is changed to use the signal.

Still further, if the optical recording medium is an optical disk, the rotational speed of the optical disk is changed according to the type of optical disk. If data in an optical disk having low reflectance is reproduced, a sufficient signal cannot be obtained at the photosensor when the laser power of the optical head is low. If it is liable that an increased laser power destroys the recording side of the medium, the rotational speed of the optical disk is increased in order to decrease the radiated time on the recording side to prevent damages in the recording side. On the other hand, the rotation speed of the optical disk is decreased when a weak laser power is irradiated at the medium. Then, noises due to the rotation can be decreased, and recording or reproducing becomes possible.

Finally, when the optical recording medium is determined not to be used for recording or reproducing even by using the above-mentioned means, for example, when focusing is not possible or when recorded data cannot be read when test data are recorded, the operation of recording or reproducing is stopped, or recording or reproducing is prohibited to the optical recording medium. In a different way, the optical recording medium is discharged from the optical recording and reproducing apparatus. Then, the undesirable situation of the destruction of the medium can be prevented.

In the above-mentioned embodiments, the optical recording and reproducing apparatuses are explained. However, a person skilled in the arts would understand easily that this invention can also be applied to an apparatus used only for reproduction.

As explained above, the type of optical information medium can be discriminated before recording or reproduction by providing a simple device by using the wavelength dependence of reflectance. Then, according to the discriminated type of the optical recording medium, the upper limit of laser power, the gain of the photosensor, the revolution number of the optical disk or the like are optimized. Even if recording or reproduction becomes impossible, the undesirable situation of destruction of the medium can be prevented. Thus, important data recorded in the optical recording medium can be protected.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention

What is claimed is:

1. An apparatus for recording and reproducing information from an optical recording medium, said apparatus comprising:

a first device which emits light at the optical recording medium, and receives the light emitted at and reflected by the optical recording medium to detect an intensity of the reflected light having a first wavelength;

a second device which emits light at the optical recording medium, and receives the light emitted at and reflected by the optical recording medium to detect an intensity of the reflected light having a second wavelength, wherein the second wavelength is longer than the first wavelength; and a discriminator which determines a type of the optical recording medium according to a difference between the intensities of the reflected light detected by said first and said second devices thereby discriminating the type of the optical recording medium according to the difference in reflectance detected by said first and second devices, wherein the difference indicates a wavelength dependence of reflectance of the optical recording medium.

2. An apparatus as claimed in claim 1, wherein said first device comprises:

a first light source which emits the light of the first wavelength directly at the optical recording medium; and a first photosensor which receives the light emitted by said first light source and reflected by the optical recording medium; and said second device comprises:

a second light source which emits the light of the second wavelength directly at the optical recording medium; and a second photosensor which receives the light emitted by said second light source and reflected by the optical recording medium.

3. An apparatus as claimed in claim 2, wherein a common photosensor is used as said first and second photosensors, wherein said first and second light sources emit their respective light at different times, and wherein said common photosensor detects the light synchronously with the emission of the light from each of said first and second light sources.

4. An apparatus as claimed in claim 2, further comprising a first optical head which comprises said first light source and said first photosensor, and comprising a second optical head which comprises said second light source and said second photosensor.

5. An apparatus as claimed in claim 2, further comprising an optical head which comprises said first light source, said first photosensor, said second light source, and said second photosensor.

6. An apparatus as claimed in claim 3, further comprising an optical head comprising said first light source, said second light source, and said common photosensor.

7. An apparatus as claimed in claim 2, further comprising an optical head which comprises said first light source and said first photosensor.

8. An apparatus as claimed in claim 3, further comprising an optical head which comprises said second light source and said second photosensor.

9. An apparatus as claimed in claim 1, wherein said first light source comprises a light emitting diode which emits an infrared light, and wherein said second light source comprises a light emitting diode which emits a red light.

10. An apparatus as claimed in claim 2, wherein said first light source comprises a light emitting diode which emits an infrared light, and wherein said second light source comprises a light emitting diode which emits a red light.

11. An apparatus as claimed in claim 1, further comprising a controller for optimizing recording and reproduction conditions according to the type of the optical recording medium determined by said discriminator.

12. An apparatus as claimed in claim 11, wherein said controller changes an upper limit of the light intensity according to the type of the optical recording medium determined by said discriminator.

13. An apparatus as claimed in claim 11, wherein said controller changes a gain of an output signal of a photosensor according to the type of the optical recording medium determined by said discriminator.

14. An apparatus as claimed in claim 11, wherein said controller changes a revolution of the optical recording medium according to the type of the optical recording medium determined by said discriminator.

15. An apparatus as claimed in claim 11, wherein said controller stops the recording or reproduction of information to and from the optical recording medium when recording or reproduction is impossible even if said controller optimizes the recording or reproducing conditions.

16. An apparatus as claimed in claim 2, wherein said discriminator obtains a first difference between output signals of at least two photo-sensing areas of said first photosensor, obtains a second difference between output signals of at least two photo-sensing areas of said second photosensor, and obtains a third difference between the first and second differences which is a difference detected between the output signals of said first photosensor and the output signals of second photosensor.

17. An apparatus as claimed in claim 2, wherein said discriminator obtains a first sum of output signals of at least two photo-sensing areas of said first photosensor, obtains a second sum of output signals of at least two photo-sensing areas of said second photosensor, and obtains a sum difference between the first and second sums which is a difference detected between the output signals of said first photosensor and the output signals of second photosensor.

\* \* \* \* \*